(12) United States Patent
Wang et al.

(10) Patent No.: US 8,954,783 B2
(45) Date of Patent: Feb. 10, 2015

(54) TWO-TIER FAILOVER SERVICE FOR DATA DISASTER RECOVERY

(75) Inventors: Shen Wang, Seattle, WA (US); Joseph Milan Filcik, Bellevue, WA (US); Vijayalakshmi Ramkumar, Bellevue, WA (US); Steven Greenberg, Seattle, WA (US); Chris Seitzinger, Duvall, WA (US); Brian Eugene Kihneman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 13/536,344

(22) Filed: Jun. 28, 2012

(65) Prior Publication Data

US 2014/0006846 A1    Jan. 2, 2014

(51) Int. Cl.
*G06F 11/00* (2006.01)

(52) U.S. Cl.
USPC ............ 714/4.11; 714/6.2; 714/6.21; 714/6.3

(58) Field of Classification Search
USPC .................................. 714/4.11, 6.2, 6.21, 6.3
See application file for complete search history.

(56) References Cited

U.S. PATENT DOCUMENTS

| | | | |
|---|---|---|---|
| 6,772,363 B2 * | 8/2004 | Pedone et al. | 714/4.3 |
| 7,058,731 B2 | 6/2006 | Kodama | |
| 7,600,146 B2 | 10/2009 | Liccione et al. | |
| 7,765,187 B2 | 7/2010 | Bergant et al. | |
| 7,861,111 B2 | 12/2010 | Doerr | |
| 7,992,031 B2 | 8/2011 | Chavda et al. | |
| 8,074,107 B2 | 12/2011 | McAlister et al. | |
| 8,230,256 B1 * | 7/2012 | Raut | 714/13 |
| 8,307,242 B2 * | 11/2012 | Arata et al. | 714/6.3 |
| 8,312,319 B2 * | 11/2012 | Hatasaki et al. | 714/13 |
| 8,369,968 B2 * | 2/2013 | Brown et al. | 700/82 |
| 8,677,180 B2 * | 3/2014 | Bayer et al. | 714/13 |
| 2012/0331336 A1 * | 12/2012 | Thiel et al. | 714/4.11 |
| 2013/0326261 A1 * | 12/2013 | Paulson | 714/4.11 |

OTHER PUBLICATIONS

Peters, "Implementing the right high availability and disaster recovery plan for your business," Aug. 2010. Technology Brief, Enterprise Strategy Group. Retrieved from http://eval.symantec.com/mktginfo/enterprise/white_papers/b-esg_brief_implementing_the_right_ha_and_disaster_recovery_plan_WP.en-us.pdf, 10 pages.

* cited by examiner

*Primary Examiner* — Joshua P Lottich
(74) *Attorney, Agent, or Firm* — Damon Rieth; Jim Ross; Micky Minhas

(57) ABSTRACT

Technologies are described herein for providing a two-tier failover service. A request to access content by an application associated with an application identifier may be identified. A first record corresponding to the application identifier may be retrieved from a database information table. The first record may include a reference identifier, a database name of a database, and a failover value. A second record corresponding to the reference identifier may be retrieved from a server information table. The second record may include an indication of a first server computer as a primary server computer and an indication of a second server computer as a secondary server computer. A connection specification to either the first server computer or the second server computer may be generated based on the first record and the second record.

20 Claims, 9 Drawing Sheets

TWO-TIER FAILOVER SERVICE FOR DATA DISASTER RECOVERY

BACKGROUND

Service applications may be configured to access content stored on databases arranged in a data center. A possible concern may be the occurrence of a natural or man-made disaster that affects the data center, and in turn, affects the content stored on the databases. For example, a tornado or hurricane can effectively destroy the data center and any data stored in the data center.

Some approaches to addressing the potential occurrence of a natural or man-made disaster may include the replication of the data in geo-redundant databases. Such geo-redundant databases may be arranged in a redundant data center that is geographically distant from a primary data center. In this manner, a natural or man-made disaster that critically affects one data center is less likely to affect the other data center.

When a failure occurs in one data center, an online service can reroute requests for data to the other data center. However, while some natural or man-made disasters might critically affect an entire data center, some other natural or man-made disasters might critically affect only a small number of the databases in the data center. Conventional failover techniques may reroute all requests for data to the redundant data center even when only a small number of databases in the primary data center have been critically affected. Such conventional failover techniques unnecessarily add workload on the redundant data center even when the primary data center can still handle certain requests. Such conventional failover techniques also increase latency of retrieving data when the primary data center is geographically closer to the user than the redundant data center.

It is with respect to these considerations and others that the disclosure made herein is presented.

SUMMARY

Technologies are described herein providing a two-tier failover service. During a disaster event, the two-tier failover service may determine whether a threshold quantity of databases are failing in a given server computer. If at least the threshold quantity of databases are failing, then the two-tier failover service may initiate a first-tier server-level failover. If less than the threshold quantity of databases are failing, then the two-tier failover service may initiate a second-tier database-level failover. The two-tier failover service may be implemented using a server information table and a database information table.

In some example technologies, a method for providing a two-tier failover service is provided. The method may include identifying a request to access content by an application associated with an application identifier. The method may also include retrieving, from a database information table, a first record corresponding to the application identifier. The first record may include a reference identifier, a database name of a database, and a failover value. The method may also include retrieving, from a server information table, a second record corresponding to the reference identifier. The second record may include an indication of a first server computer as a primary server computer and an indication of a second server computer as a secondary server computer. The method may further include generating a connection specification to either the first server computer or the second server computer based on the first record and the second record.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
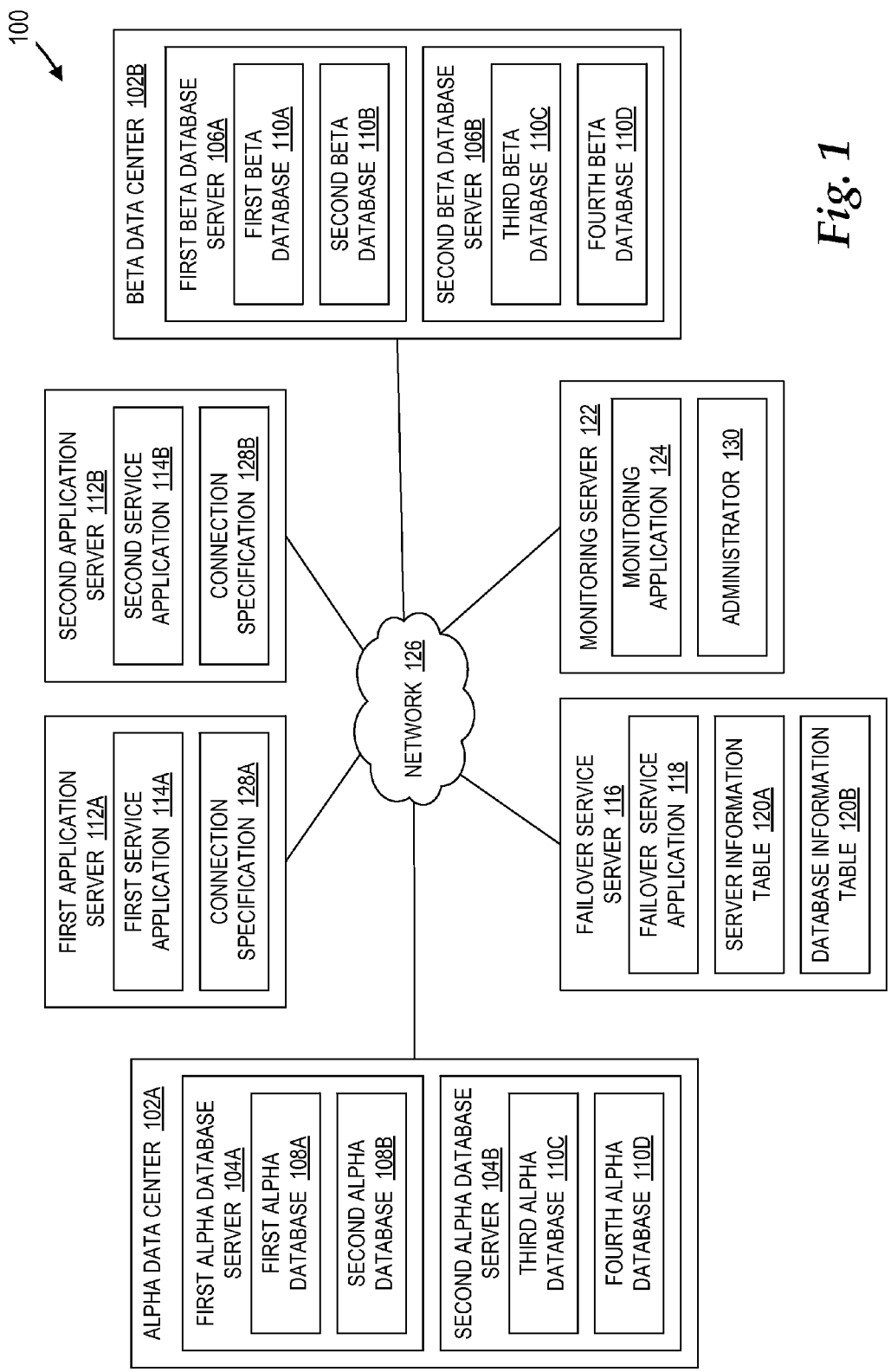
FIG. 1 is a block diagram illustrating an example two-tier failover service architecture, in accordance with some embodiments.

The following detailed description is generally directed to concepts and technologies for providing a two-tier failover service for data disaster recovery. An example two-tier failover architecture may include a primary data center and a secondary data center arranged in geographically distant locations. The primary data center may include one or more primary database server computers. The secondary data center may include one more secondary database server computers. Each primary database server computer may include one or more primary databases, and each secondary database server computer may include one or more secondary databases.

As used herein, the term "database" should be broadly interpreted to any collection of data stored on a medium and accessible by a computer. For example, the database may include flat data files or structured data files. Also as used herein, the term "database server computer" should be broadly interpreted to any data storage device.

Each secondary database server computer may be configured to periodically replicate (also referred to as mirror) a corresponding one of the primary database server computers. More specifically, each secondary database in a secondary database server computer may be configured to replicate a corresponding one of the primary databases in a primary database server computer. Thus, each corresponding primary database server and secondary database server computer may form a related database server pair.

The two-tier failover architecture may further include one or more application server computers and a monitoring server computer. The application server computers may be configured to execute one or more applications. Each application may be configured to access a corresponding one of the primary databases in a primary database server computer. The monitoring server computer may be configured to monitor the health of the primary database server computers. For example, the monitoring server computer may be configured to monitor the occurrence or potential occurrence of hardware and/or software failures associated with the primary database server computers.

When an administrator determines that one or more of the primary database server computers is failing or is about to fail, the administrator may initiate the two-tier failover service. According to various embodiments, the two-tier failover service may execute either a first-tier server-level failover or a second-tier database-level failover. In the first-tier server-level failover, all data requests for primary databases in the primary database server computer are rerouted to corresponding secondary databases in the secondary database server computer. This is the case even if one or more of the primary databases in the primary database server are still operational. In the second-tier server-level failover, only data requests for failing primary databases in the primary database server computer are rerouted to corresponding secondary databases in the secondary database server computer. That is, in the second-tier database-level failover, the operational primary databases in the primary database server computer continue to handle data requests.

Under the two-tier failover service, an administrator may initiate the first-tier server-level failover if the quantity of failing primary databases exceeds a threshold. The administrator may initiate the second-tier database-level failover if the quantity of failing primary databases does not exceed the threshold. The administrator may maintain database server computer connection information on a first table and database connection information on a second table. When an application requests access to its content, the application may be configured to generate a connection specification based on information retrieve from the first table and the second table. The application may be configured to utilize the connection specification in order to access a particular database storing the application's content. Thus, by reconfiguring the first table and/or the second table, the administrator can control whether the application accesses the relevant database on the primary database server computer or the secondary database server computer.

For example, when an application requests access to its content, the application may be configured to retrieve relevant database server computer connection information from the first table and relevant database connection information from the second table. The application may be configured to generate a connection specification using the retrieved database server computer connection information and database connection information. The application may be configured to utilize the connection specification to access the relevant database and to forward the request to the relevant database.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing a two-tier failover service for data disaster recovery is provided. In particular, FIG. 1 is a block diagram illustrating an example two-tier failover service architecture 100, in accordance with some embodiments. The two-tier failover service architecture 100 may include an alpha data center 102A and a beta data center 102B. The data centers 102A-102B may be collectively or generically referred to as data centers 102. According to various embodiments, the data centers 102 may be arranged at geographically distant locations. In this way, a natural or man-made disaster that critically affects one data center is unlikely to critically affect the other data center.

The alpha data center 102A may include one or more alpha database server computers, such as a first alpha database server computer 104A and a second alpha database server computer 104B. The alpha database server computers 104A-104B may be collectively or generically referred to as alpha database server computers 104. The beta data center 102B may include one or more beta database server computers, such as a first beta database server computer 106A and a second beta database server computer 106B. The beta database server computers 106A-106B may be collectively or generically referred to as beta database server computers 106.

The first alpha database server computer 104A may include one or more alpha databases, such as a first alpha database 108A and a second alpha database 108B. The second alpha database server computer 104B may include one or more additional alpha databases, such as a third alpha database 108C and a fourth alpha database 108D. The alpha databases 108A-108D may be collectively or generically referred to as alpha databases 108. The first beta database server computer 106A may include one or more beta databases, such as a first beta database 110A and a second beta database 110B. The second beta database server computer 106B may include one or more additional beta databases, such as a third beta database 110C and a fourth beta database 110D. The beta databases 110A-110D may be collectively or generically referred to as beta databases 110.

The two-tier failover service architecture 100 may further include one or more application server computers, such as a first application server computer 112A and a second application server computer 112B. The application server computers 112A-112B may be collectively or generically referred to as application server computers 112. The first application server computer 112A may be configured to host one or more service applications, such as a first service application 114A. The second application server computer 112B may be configured to host one or more additional service applications, such as a second service application 114B. The service applications 114A-114B may be collectively or generically referred to as service applications 114.

Although not so illustrated in FIG. 1, the application server computers 112 may be communicatively coupled to one or more front-end web server computers according to some embodiments. The front-end web server computers may be configured to host web pages, web services, and/or web parts that are utilized to process requests received from end users. The front-end web server computers may be configured to direct such user requests to the application server computers 112. The application server computers 112 can also return results to the user requests to the front-end web server computers.

The two-tier failover service architecture 100 may further include a failover service server computer 116. The failover service server computer 116 may be configured to host a failover service application 118. The failover service application 118 may be configured to access a server information table 120A and a database information table 120B. The information tables 120A-120B may be collectively or generically referred to as information tables 120.

The two-tier failover service architecture 100 may further include a monitoring server computer 122. The monitoring server computer 122 may include a monitoring application 124. The monitoring application 124 may be configured to monitor the health of one or more of the data centers 102, including their corresponding database server computers 104, 106 and databases 108, 110. For example, the monitoring application 124 may be configured monitor the occurrence or potential occurrence of hardware and/or software failures in the data centers 102. The data centers 102, the application server computers 112, the failover service server computer 116, and the monitoring server computer 122 may be communicatively coupled via a network 126.

The first alpha database 108A and the first beta database 110A may be configured to store content associated with the first service application 114A. In an illustrative example, the first alpha database server computer 104A may initially be configured as the primary server computer for handling requests for content from the first service application 114A. The first beta database server computer 106A may initially be configured as the secondary server computer for handling requests for content from the first service application 114A. That is, requests for content may be handled by the first alpha database 108A, and the first beta database 110A may replicate the first alpha database 108A. The first alpha database 108A and the first beta database 110A may share the same database name. Because the first alpha database server computer 104A and the first beta database server computer 106A include the redundant databases 108A, 110A, respectively, the first alpha database server computer 104A and the first beta database server computer 106A may form a database server pair.

The second alpha database 108B and the second beta database 110B may be configured to store content associated with the second service application 114B. In an illustrative example, the second alpha database server computer 104B may initially be configured as the primary server computer for handling requests for content from the second service application 114B. The second beta database server computer 106B may initially be configured as the secondary server computer for handling requests for content from the second service application 114B. That is, requests for content may be handled by the second alpha database 108B, and the second beta database 110B may replicate the second alpha database 108B. The second alpha database 108B and the second beta database 110B may share the same database name. Because the second alpha database server computer 104B and the second beta database server computer 106B include the redundant databases 108B, 110B, respectively, the second alpha database server computer 104B and the second beta database server computer 106B may form a database server pair.

Access to the first alpha database 108A and the second alpha database 108B may be controlled by the failover service application 118 and/or the service applications 114. In an illustrative example, when the first service application 114A requests (e.g., a read or write request) access to its content, the first service application 114A may be configured read relevant information from the server information table 120A and the database information table 120B.

In an illustrative sequence, the first service application 114A may be configured to retrieve, from the database information table 120B, a database record corresponding to the application ID. The database record may provide a reference ID of the database server pair that includes the databases that store the requested content. The database record may also provide a database name of the database that stores the requested content. The database record may further include a database failover value. Upon retrieving the database record, the first service application 114A may be configured to retrieve, from the server information table 120A, a server record corresponding to the reference ID of a database server pair. The server record may provide server IDs of the primary server computer and the secondary server computer in the database server pair.

The first service application 114A may be configured to generate a connection specification 128A based on the retrieved database record and the retrieved server record. For example, the connection specification 128A may be a connection string that includes the relevant server ID and the database name of the database that stores the requested content. The connection specification 128A may also include login and/or authentication information for connecting to the database server computer corresponding to the server ID. The first service application 114A may be configured to utilize the connection specification 128A to access the appropriate database server computer and database and to forward the request to the database. It should be appreciated that the second service application 114B may also be configured to generate its own connection specification 128B in a similar manner. The connection specifications 128A-128B may be collectively or generically referred to as connection specifications 128.

The server information table 120A may include multiple rows. Each row of the server information table 120A may correspond to a server record. For example, an illustrative server record may correspond to a database server pair that includes the first alpha database server computer 104A and the first beta database server computer 106A. In this example, the server record may indicate that the first alpha database server computer 104A is the primary server computer and that the second alpha database server computer 104B is the secondary server computer. An illustrative example of the server information table 120A is described below with reference to FIG. 2.

The database information table 120B may include multiple rows. Each row of the database information table 120B may correspond to a database record. For example, the database information table 120B may include a first row corresponding to a first database record and a second row corresponding to a second database record. In this example, the first database record may correspond to the first service application 114A and may include a first application ID of the first service application 114A, a reference ID corresponding to the database server computer that includes the first alpha database server computer 104A and the first beta database server computer 106A, a first database name of the database that stores content associated with the first service application 114A, and a first database ("DB") failover value. The second database record may correspond to the second service application 114B and may include a second application ID of the second service application 114B, the reference ID corresponding to the database server computer that includes the first alpha database server computer 104A and the first beta database server computer 106A, a second database name of the database that stores content associated with the second service application 114B, and a second DB failover value. An illustrative example of the database information table 120B is described below with reference to FIG. 2.

The first database name may correspond to the first alpha database 108A and the first beta database 110A. That is, the first alpha database 108A and the first beta database 110A may share the same database name, and the first alpha database 108A and the first beta database 110A may replicate each other. The second database name may correspond to the second alpha database 108B and the second beta database 110B. That is, the second alpha database 108B and the second beta database 110B may share the same database name, and the second alpha database 108B and the second beta database 110B may replicate each other. As described in greater detail below, the first DB failover value and the second DB failover value may be utilized to initiate a database-level failover.

When the alpha data center 102A is fully operational, the server record may indicate that the first alpha database server computer 104A is the primary server computer and that the first beta database server computer 106A is the secondary server computer. The first database name may correspond to the first alpha database 108A and the first beta database 110A. The second database name may correspond to the second alpha database 108B and the second beta database 110B. The first DB failover value may be configured to a first value, which indicates no database-level failover. The second DB failover value may also be configured to the first value.

When the first service application 114A requests access to its content, the first service application 114A may retrieve information from the information tables 120 indicating that the first alpha database server computer 104A is the primary server computer and that the first DB failover value indicates no database-level failover. Thus, requests from the first service application 114A may be handled using the first alpha database 108A, which corresponds to the first database name. Similarly, when the second service application 114B requests access to its content, the second service application 114B may retrieve information from the information tables 120 indicating that the first alpha database server computer 104A is the primary server computer and that the second DB failover value indicates no database-level failover. Thus, requests from the second service application 114B may be handled using the second alpha database 108B, which corresponds to the second database name.

A natural or man-made disaster may critically affect a quantity of databases in the first alpha database server computer 104A greater than a threshold. In this case, an administrator 130 may utilize the monitoring application 124 to determine that the quantity of databases that are failing is greater than the threshold. The administrator 130 may be a human administrator or an automated process. Upon determining that the quantity of databases that are failing is greater than the threshold, the administrator 130 may update, via the failover service application 118, the server information table 120A to indicate that the first beta database server computer 106A is now the primary server computer. It should be noted that the database information table 120B may not updated in this case.

When the first service application 114A requests access to its content, the first service application 114A may retrieve information from the information tables 120 indicating that the first beta database server computer 106A is the primary server computer and that the first DB failover value indicates no database-level failover. Thus, requests from the first service application 114A may be handled using the first beta database 110A, which corresponds to the first database name. Similarly, when the second service application 114B requests access to its content, the second service application 114B may retrieve information from the information tables 120 indicating that the first beta database server computer 106A is the primary server computer and that the second DB failover value indicates no database-level failover. Thus, requests from the second service application 114B may be handled using the second beta database 110B, which corresponds to the second database name.

In contrast to the above, a natural or man-made disaster may critically affect a quantity of databases in the first alpha database server computer 104A not greater than the threshold. In this case, the administrator 130 may utilize the monitoring application 124 to determine that the quantity of databases that are failing is not greater than the threshold. For example, the first alpha database 108A may not be operational, while the second alpha database 108B may be operational. Upon determining that the quantity of databases that are failing is not greater than the threshold, the administrator 130 may update, via the failover service application 118, the database information table 120B. In particular, the administrator 130 may update the first DB failover value to a second value, which indicates a database-level failover. It should be noted that the second DB failover value may not be updated in this case. It should also be noted that the server information table 120A may not be updated in this case.

When the first service application 114A requests access to its content, the first service application 114A may retrieve information from the information tables 120 indicating that the first alpha database server computer 104A is the primary server computer, that the first beta database server computer 106A is the secondary server computer, and that the first DB failover value indicates database-level failover. Even though the first alpha database server computer 104A is the primary server computer, the first DB failover value indicates a database-level failover from the primary server computer to the secondary server computer. Thus, requests from the first service application 114A may be handled using the first beta database 110A, which corresponds to the first database name.

When the second service application 114B requests access to its content, the second service application 114B may retrieve information from the information tables 120 indicating that the first alpha database server computer 104A is the primary server computer and that the second DB failover value indicates no database-level failover. Thus, requests from the second service application 114B may be handled using the second alpha database 108B, which corresponds to the second database name.

It should be appreciated that a given database server may be configured as a primary server computer for one application server computer but as a secondary server computer another application server computer. For example, the first application server computer 112A may be physically closer to the first alpha database server computer 104A, and the second application server computer 112B may be physically closer to the first beta database server computer 106A. Another consideration load balancing. In this example, the first alpha database server computer 104A may be configured as the primary server computer for the first application server computer 112A but as the secondary server computer for the second application server computer 112B. Further, the first beta database server computer 106A may be configured as the primary server computer for the second application server computer 112B but as the secondary server computer for the first application server computer 112A.

As shown in the examples described above, the failover service application 118 may enable two tiers of failover: a first-tier server-level failover and a second-tier database-level failover. The database-level failover may be utilized when the quantity of failing databases in the primary server computer is less than a threshold. In this manner, the secondary server computer is accessed only for the failing databases. That is, the application server computer still accesses the primary server computer for operational databases. If, for example, the application server computer is physically closer to the primary server computer, the continuation of accesses to the primary server computer may reduce latency. Further, if a significant number of databases in the primary server computer are still operational, the continuation of accesses to the primary server computer may avoid unnecessarily increasing the load on the secondary server computer.

Figure 2:
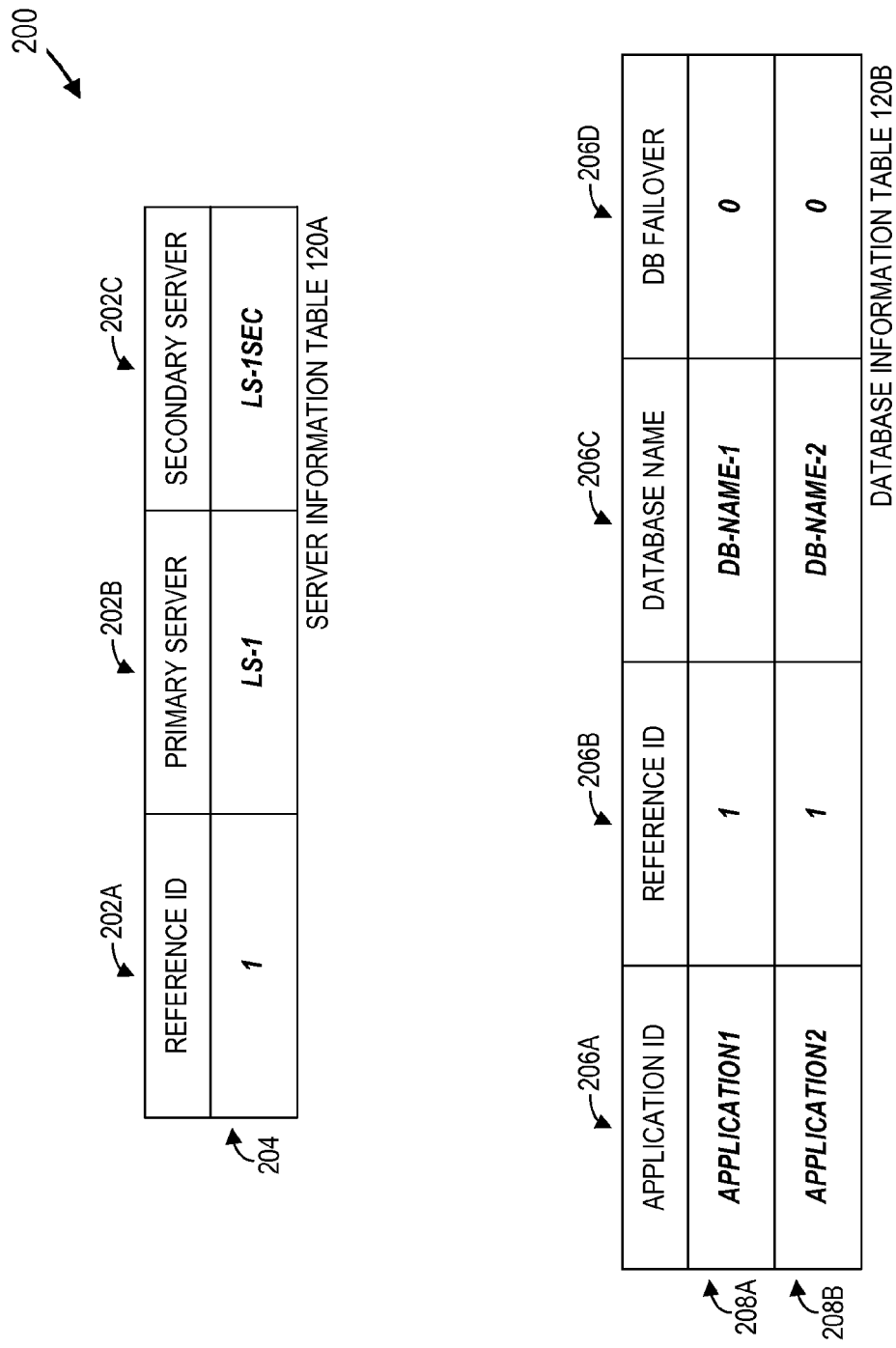
FIG. 2 is a diagram illustrating an example implementation of a server information table and a database information table, in accordance with some embodiments.

Referring now to FIGS. 2-7, additional details regarding the server information table 120A and the database information table 120B will be provided. FIG. 2 is a diagram illustrating an example implementation 200 of the server information table 120A and the database information table 120B, in accordance with some embodiments. The server information table 120A and the database information table 120B may be embodied on one or more files.

In some embodiments, separate database information tables may correspond to mirrored databases. For example, if the first alpha database 108A and the first beta database 110A are mirrored databases, a first database information table may correspond to the first alpha database 108A (failing over to the first beta database 110A) and a second database information table may correspond to the first beta database 110A (failing over to the first alpha database 108A). In some other embodiments, a single database information table may correspond to mirrored databases. For example, as previously described, the first alpha database 108A and the first beta database 110A may share the same database name. As a result, a single record in the database information table may include DB failover values for handling both failover scenarios between the first alpha database 108A and the first beta database 110A.

The server information table 120A may include a reference ID column 202A, a primary server column 202B, and a secondary server column 202C. The columns 202A-202C may be collectively or generically referred to as server information columns 202. The server information table 120A may include multiple rows. Each row may correspond to a record, such as a record 204. The record 204 may include an entry corresponding to each of the columns 202. For example, the record 204 may include a first entry corresponding to the reference ID column 202A, a second entry corresponding to the primary server column 202B, and a third entry corresponding to the secondary server column 202C.

An entry under the reference ID column 202A may specify a reference ID of a particular database server pair. An entry under the primary server column 202B may specify a server ID of one database server computer in the database server pair. In particular, the server ID identified under the primary server column 202B may be configured as the primary server computer. An entry under the secondary server column 202C may specify a server ID of the other database server computer in the database server pair. In particular, the server ID identified under the secondary server column 202C may be configured as the secondary server computer.

The database information table 120B may include an application ID column 206A, a reference ID column 206B, a database name column 206C, and a DB failover column 206D. The columns 206A-206D may be collectively or generically referred to as database information columns 206. The database information table 120B may include multiple rows. Each row may correspond to a record, such as a first record 208A and a second record 208B. The records 208A-208B may be collectively or generically referred to as records 208. Each of the records 208 may include an entry corresponding to each of the columns 206. For example, each of the records 208 may include a first entry corresponding to the application ID column 206A, a second entry corresponding to the reference ID column 206B, a third entry corresponding to the database name column 206C, and a fourth entry corresponding to the DB failover column 206D.

As illustrated in FIG. 2, the record 204 specifies a reference ID "1", a primary server "LS-1", and a secondary server "LS-1 sec". The reference ID "1" may refer to a particular database server pair that includes the database server computers identified by the server IDs "LS-1" and "LS-1 sec." The listing of "LS-1" under the primary server column 202B specifies that the database server computer identified by the server ID "LS-1" is configured as the primary server computer. The listing of "LS-1sec" under the secondary server column 202C specifies that the database server computer identified by the server ID "LS-1sec" is configured as the secondary server computer.

Also as illustrated in FIG. 2, the first record 208A specifies an application ID "Application1", a reference ID "1", a database name "DB-Name-1", and a DB failover value "0". In this example, the first record 208A indicates that a particular application identified by the application ID "Application1" is associated with a particular database server pair identified by the reference ID "1". The first record 208A also indicates that content associated with the application identified by the application ID "Application 1" is stored in a particular database identified by the database name "DB-Name-1." The first record 208A further indicates no database-level failover. In some embodiments, a DB failover value "0" may indicate no database-level failover, and a DB failover value "1" may indicate a database-level failover. In other embodiments, any suitable values or symbols may be utilized to represent whether a database-level failover has been performed.

The second record 208B specifies an application ID "Application2", a reference ID "1", a database name "DB-Name-2", and a DB failover value "0". In this example, the second record 208B indicates that a particular application identified by the application ID "Application2" is associated with a particular database server pair identified by the reference ID "1". The second record 208B also indicates that content associated with the application identified by the application ID "Application 2" is stored in a particular database identified by the database name "DB-Name-2." The second record 208B further indicates no database-level failover.

Figure 3:
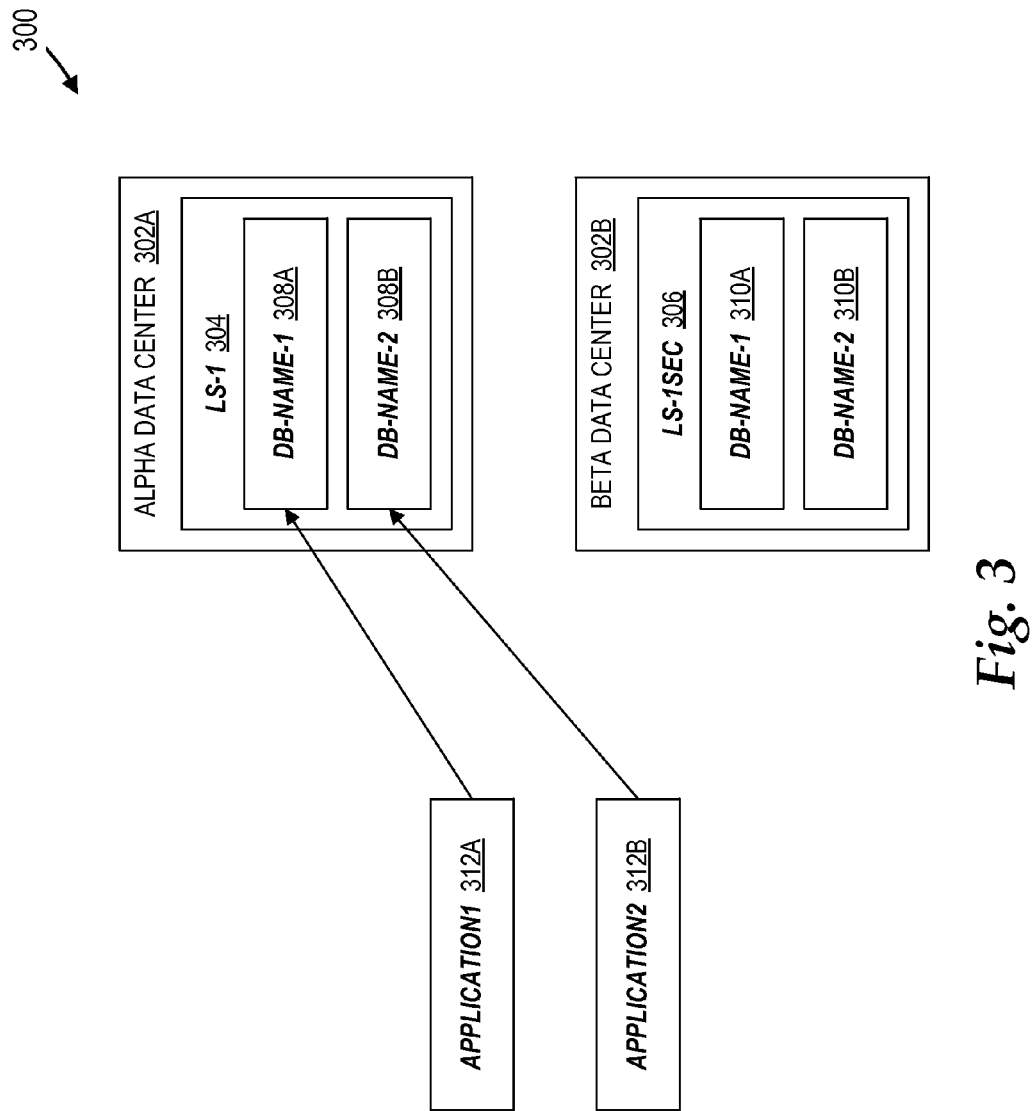
FIG. 3 is a block diagram illustrating an example two-tier failover service architecture corresponding to the example implementation of the server information table and the database information table illustrated in FIG. 2, in accordance with some embodiments.

FIG. 3 is a block diagram illustrating an example two-tier failover service architecture 300 corresponding to the example implementation of the server information table 120A and the database information table 120B illustrated in FIG. 2, in accordance with some embodiments. The two-tier failover service architecture 300 may include an alpha data center 302A and a beta data center 302B. The data centers 302A-302b may be collectively or generically referred to as data centers 302. The alpha data center 302A may include one or more database server computers, such as an alpha database server computer 304. The beta data center 302B may include one or more database server computers, such as a beta database server computer 306. The alpha database server computer 304 may be associated with a server ID "LS-1". The beta database server computer 306 may be associated with a server ID "LS-1sec."

The alpha database server computer 304 and the beta database server computer 306 may be a database server pair. The alpha database server computer 304 may include one or more databases, such as a first alpha database 308A and a second alpha database 308B. The beta database server computer 306A may include one or more databases, such as a first beta database 310A and a second beta database 310B. The first beta database 310A may be configured to replicate the first alpha database 308A. The second beta database 310B may be configured to replicate the second alpha database 308B. The first alpha database 308A and the first beta database 310A may share a database name "DB-Name-1". The second alpha database 308B and the second beta database 310B may share a database name "DB-Name-2."

A first service application 312A may be associated with an application ID "Application1". A second service application 312B may be associated with an application ID "Application 2". When the first service application 312A requests access to its content, the first service application 312A may retrieve relevant information from the information tables 120. In particular, as illustrated in FIG. 2, the first record 208A indicates no database-level failover, and the record 204 indicates that the alpha database server computer 304 is the primary server computer. As a result, the first service application 312A will generate a connection specification that directs the first service application 312A to the first alpha database 308A. The first alpha database 308A corresponds to the database name specified by the first record 208A.

When the second service application 312B requests access to its content, the second service application 312B may retrieve relevant information from the information tables 120. In particular, as illustrated in FIG. 2, the second record 208B indicates no database-level failover, and the record 204 indicates that the alpha database server computer 304 is the primary server computer. As a result, the second service application 312B will generate a connection specification that directs the second service application 312B to the second alpha database 308B. The second alpha database 308B corresponds to the database name specified by the second record 208B.

Figure 4:
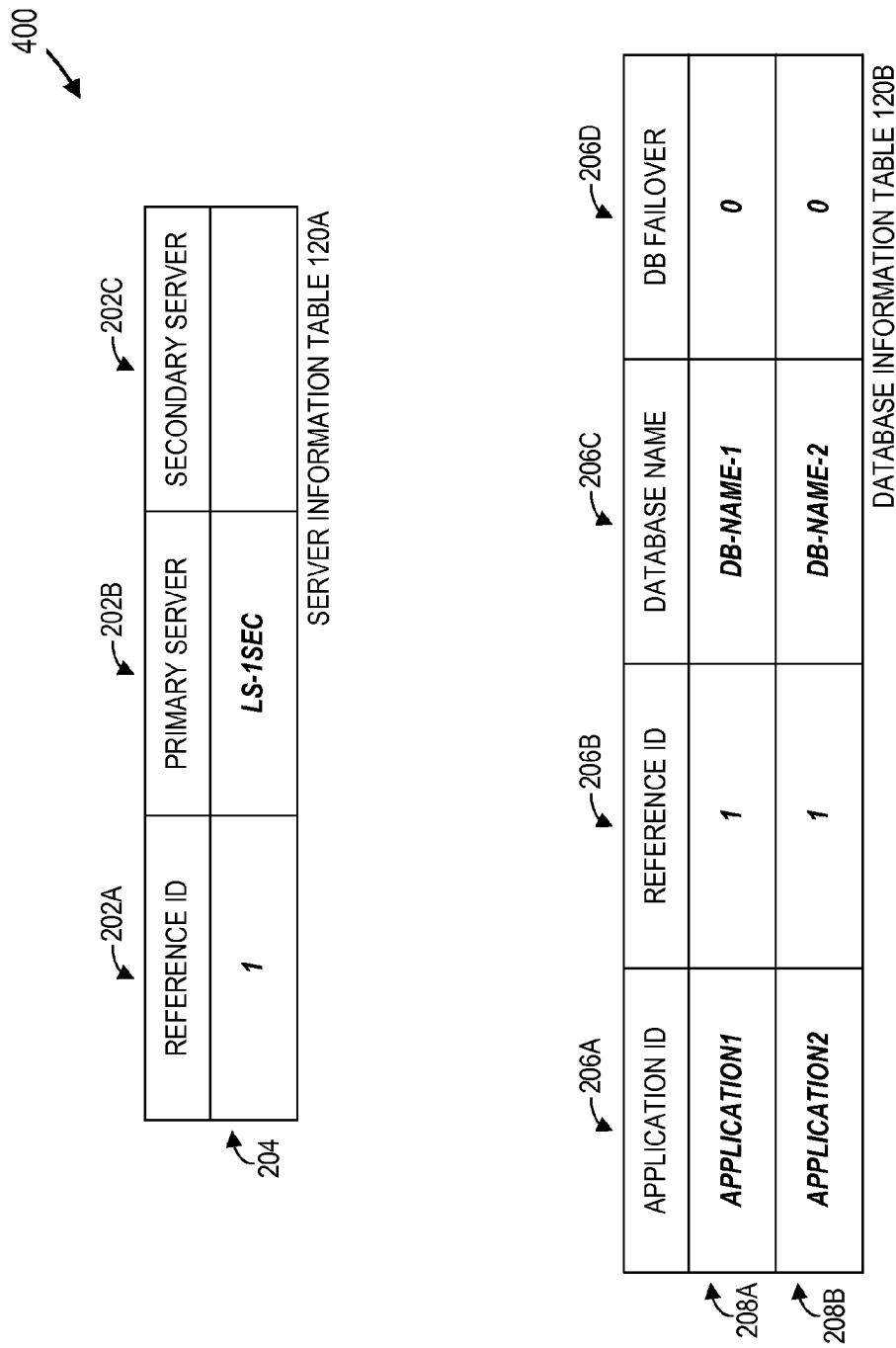
FIG. 4 is a diagram illustrating an example implementation of the server information table and the database information table, in accordance with some embodiments.

FIG. 4 is a diagram illustrating an example implementation 400 of the server information table 120A and the database information table 120B, in accordance with some embodiments. At some point, the alpha data center 302A may suffer a natural or man-made disaster that affects a quantity of databases in the alpha database server computer 304 greater than a threshold. As a result, the administrator 130 may update, via the failover service application 118, the server information table 120A. In particular, the record 204 may be updated to specify that the beta database server computer 306 is now configured as the primary server computer.

Figure 5:
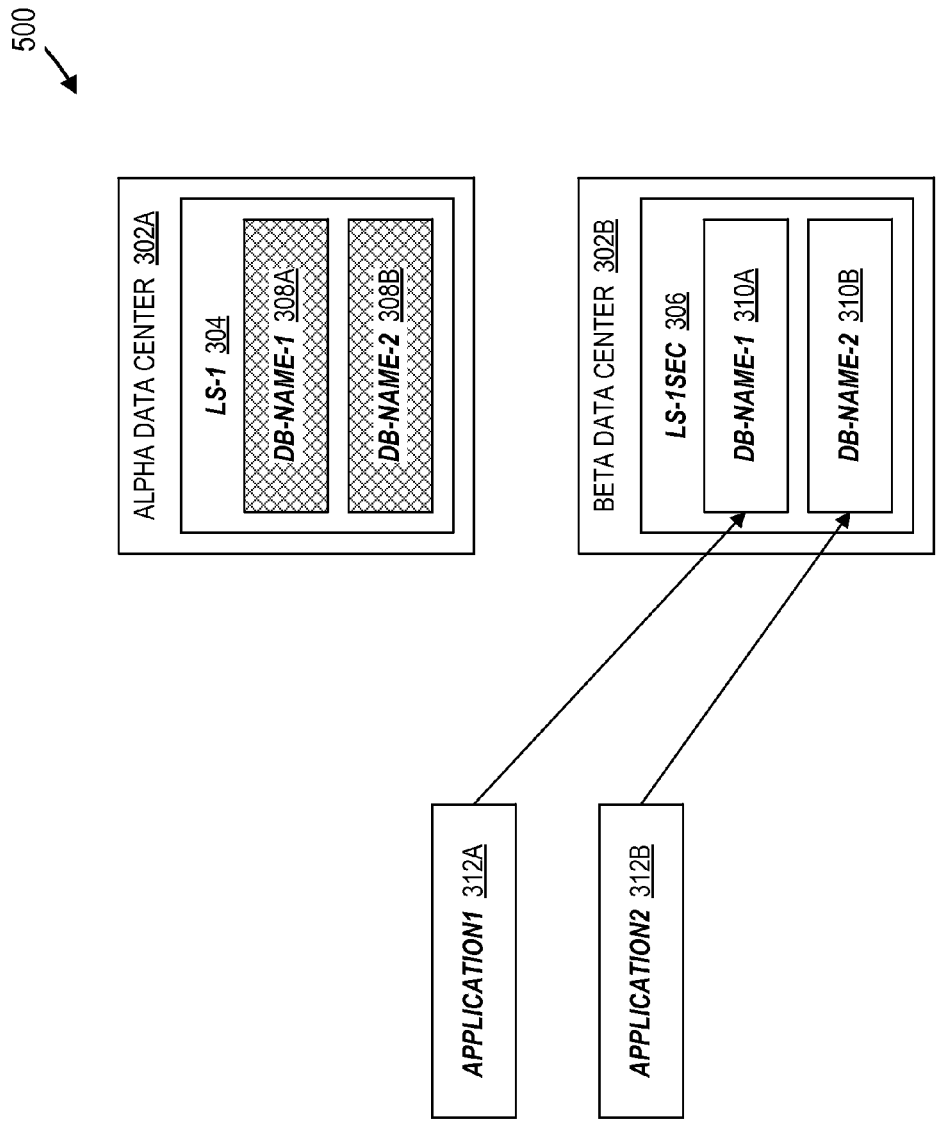
FIG. 5 is a block diagram illustrating an example two-tier failover service architecture corresponding to the example implementation of the server information table and the database information table illustrated in FIG. 4, in accordance with some embodiments.

FIG. 5 is a block diagram illustrating an example two-tier failover service architecture 500 corresponding to the example implementation of the server information table 120A and the database information table 120B illustrated in FIG. 4, in accordance with some embodiments. When the first service application 312A requests access to its content, the first service application 312A may retrieve relevant information from the information tables 120. In particular, as illustrated in FIG. 4, the first record 208A indicates no database-level failover, and the record 204 indicates that the beta database server computer 306 is the primary server computer. As a result, the first service application 312A will generate a connection specification that directs the first service application 312A to the first beta database 310A. The first beta database 310A corresponds to the database name specified by the first record 208A.

When the second service application 312B requests access to its content, the second service application 312B may retrieve relevant information from the information tables 120. In particular, as illustrated in FIG. 4, the second record 208B indicates no database-level failover, and the record 204 indicates that the beta database server computer 306 is the primary server computer. As a result, the second service application 312B will generate a connection specification that directs the second service application 312B to the second beta database 310B. The second beta database 310B corresponds to the database name specified by the second record 208B.

Figure 6:
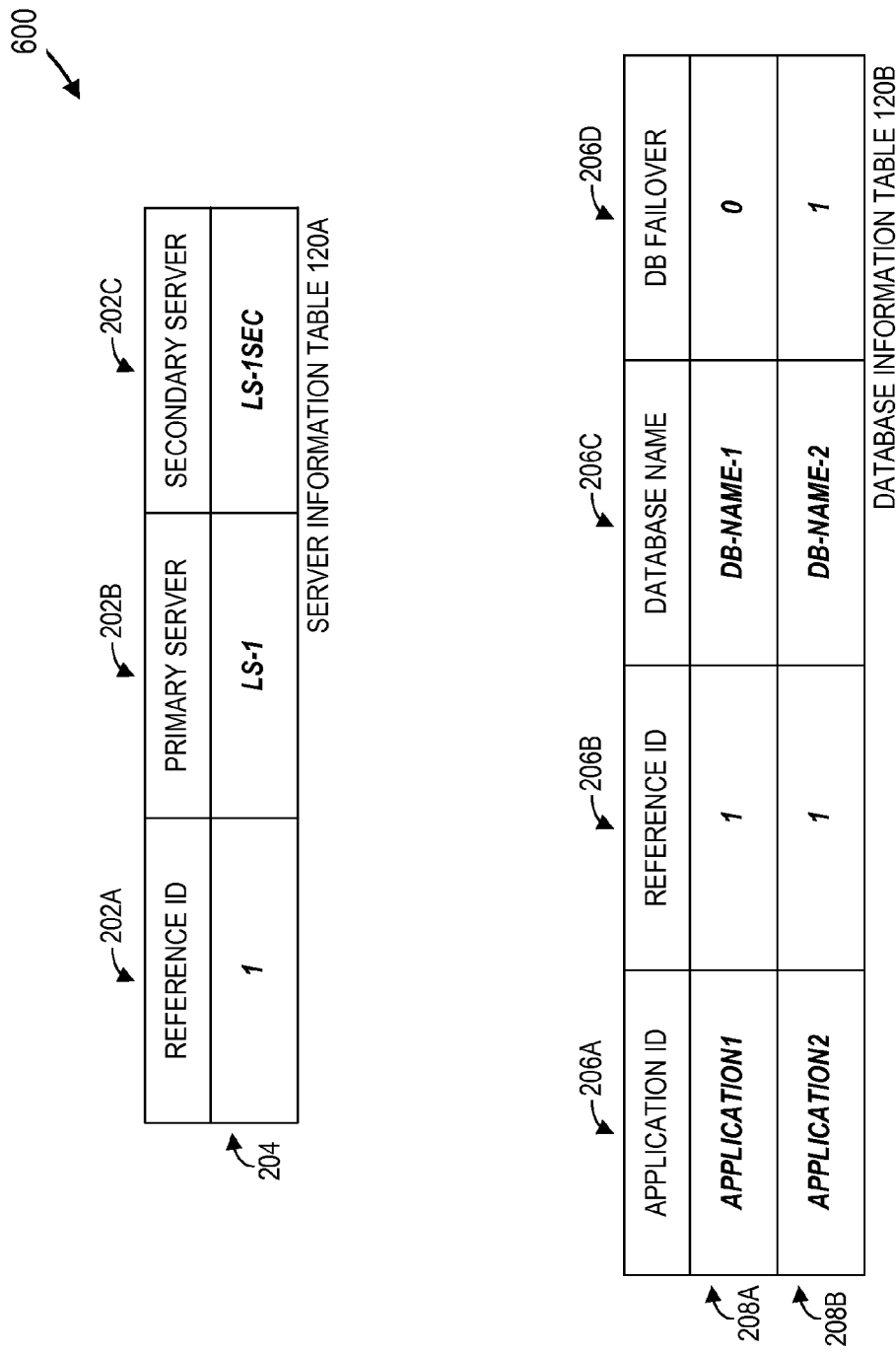
FIG. 6 is a diagram illustrating an example implementation of the server information table and the database information table, in accordance with some embodiments.

FIG. 6 is a diagram illustrating an example implementation 600 of the server information table 120A and the database information table 120B, in accordance with some embodiments. At some point, the alpha data center 302A may suffer a natural or man-made disaster that affects a quantity of databases in the alpha database server computer 304 not greater than the threshold. For example, the first alpha database 308A may be operational, but the second alpha database 308B may have failed. As a result, the administrator 130 may update, via the failover service application 118, the database information table 120B. In particular, the DB failover value in the second record 208B may be updated to indicate a database-level failover.

Figure 7:
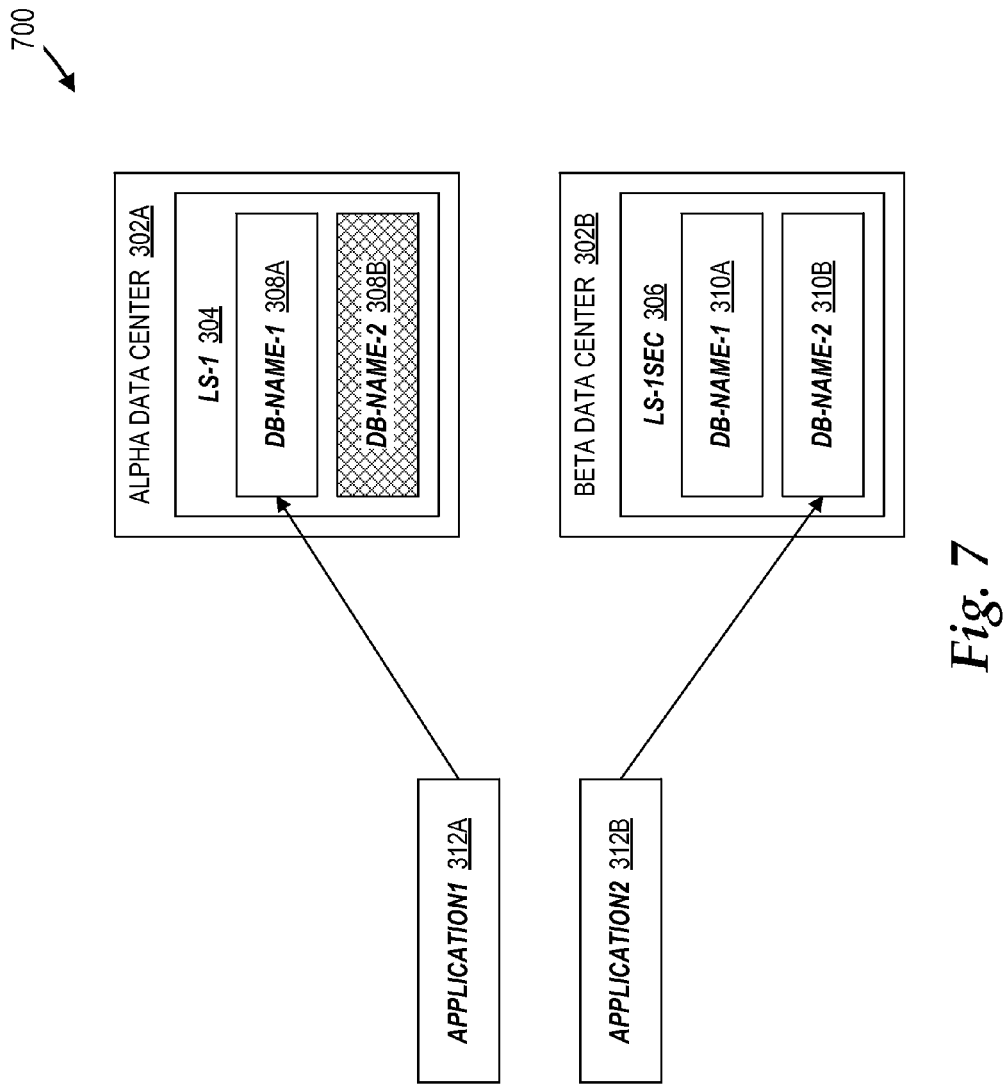
FIG. 7 is a block diagram illustrating an example two-tier failover service architecture corresponding to the example implementation of the server information table and the database information table illustrated in FIG. 6, in accordance with some embodiments.

FIG. 7 is a block diagram illustrating an example two-tier failover service architecture 700 corresponding to the example implementation of the server information table 120A and the database information table 120B illustrated in FIG. 6, in accordance with some embodiments. When the first service application 312A requests access to its content, the first service application 312A may retrieve relevant information from the information tables 120. In particular, as illustrated in FIG. 6, the first record 208A indicates no database-level failover, and the record 204 indicates that the alpha database server computer 304 is the primary server computer. As a result, the first service application 312A will generate a connection specification that directs the first service application 312A to the first alpha database 308A. The first alpha database 308A corresponds to the database name specified by the first record 208A.

When the second service application 312B requests access to its content, the second service application 312B may retrieve relevant information from the information tables 120.

In particular, as illustrated in FIG. 4, the second record 208B indicates database-level failover from the primary server computer to the secondary server computer, and the record 204 indicates that the beta database server computer 306 is the secondary server computer. As a result, the second service application 312B will generate a connection specification that directs the second service application 312B to the second beta database 310B. The second beta database 310B corresponds to the database name specified by the second record 208B.

Figure 8:
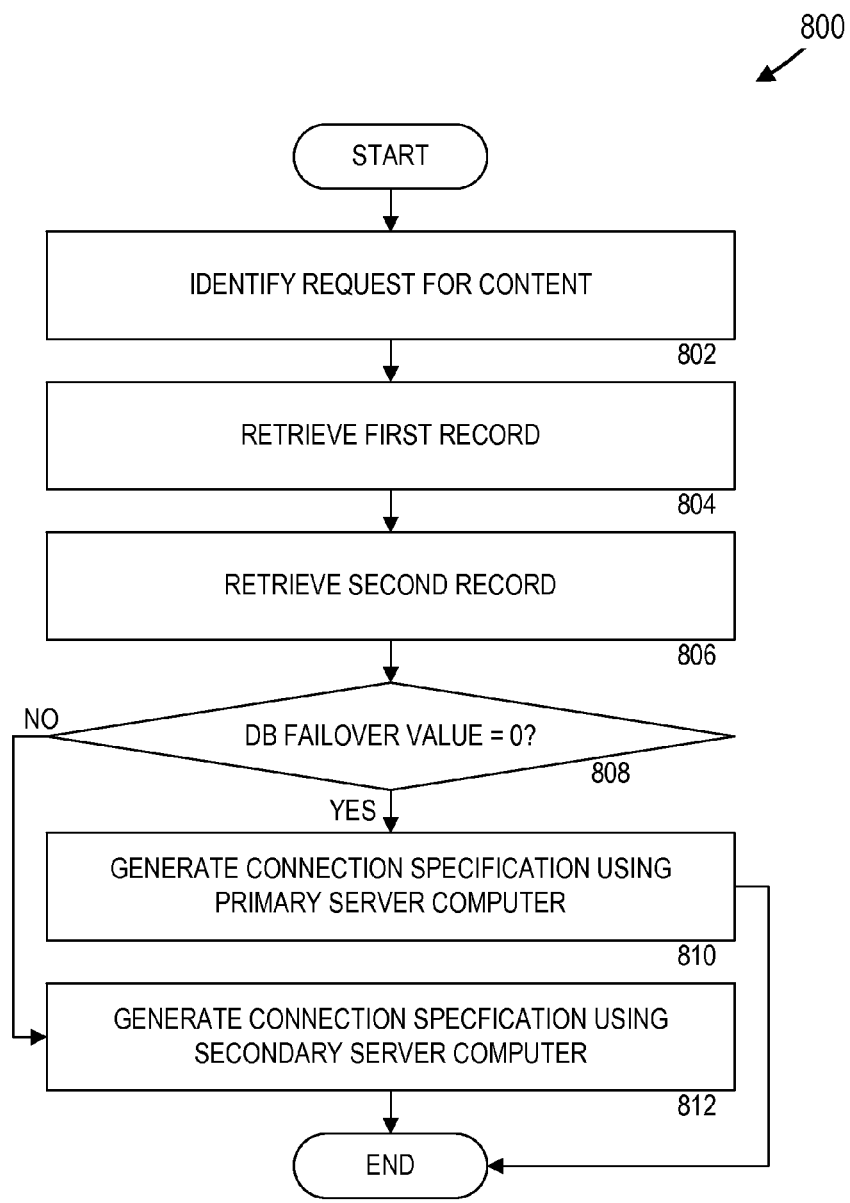
FIG. 8 is a flow diagram illustrating an example method for providing a two-tier failover service, in accordance with some embodiments.

Referring now to FIG. 8, additional details regarding the operation of the failover service application 118 will be provided. FIG. 8 is a flow diagram illustrating an example method for providing a two-tier failover service, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 8, a routine 800 begins at operation 802, where a service application, such as the service applications 114, identifies a request for its content. The request may include an application identifier associated with the application. After operation 802, the routine 800 proceeds to operation 804.

At operation 804, the service application retrieves, from the database information table 120B, a first record corresponding to the application identifier. The first record may include a reference identifier, a database name of a database, and a failover value. After operation 804, the routine 800 proceeds to operation 806.

At operation 806, the service application retrieves, from the server information table 120A, a second record corresponding to the reference identifier in the first record. The second record may include an indication of a first server computer as a primary server computer and another indication of a second server computer as a secondary server computer. After operation 806, the routine 800 proceeds to operation 808.

At operation 808, the service application determines whether the failover value indicates that database-level failover has been initiated. If the failover value indicates that no database-level failover has been initiated, then the routine 800 proceeds to operation 810. If the failover value indicates that database-level failover has been initiated, then the routine 800 proceeds to operation 812.

At operation 810, the service application generates the connection specification 128 for accessing the database in the primary server computer. At operation 812, the service application generates the connection specification 128 for accessing the database in the secondary server computer. After operations 810 or 812, the routine 800 may either repeat (e.g., periodically, continuously, or on demand as needed) or terminate.

Figure 9:
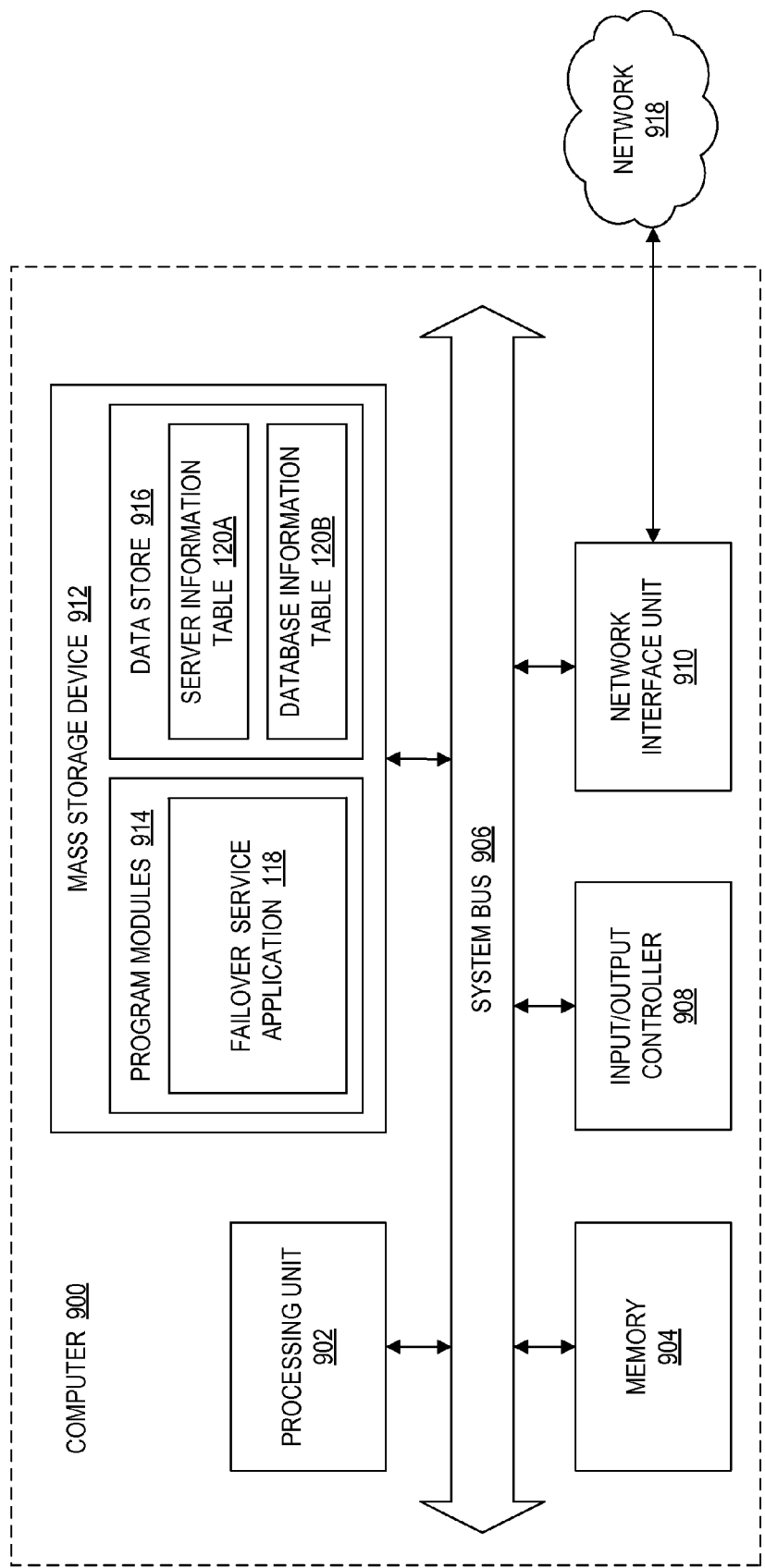
FIG. 9 is a computer architecture diagram showing an illustrative computer hardware architecture for a computing system capable of implementing the embodiments presented herein.

FIG. 9 is an example computer architecture diagram illustrating a computer 900. Examples of the computer 900 may include the failover service server computer 116. The computer 900 may include a central processing unit 902, a system memory 904, and a system bus 906 that couples the memory 904 to the central processing unit 902. The computer 900 may further include a mass storage device 912 for storing one or more program modules 914 and a data store 916. An example of the program modules 914 may include the failover service application 118. The data store 916 may store the server information table 120A and the database information table 120B. The failover service application 118 may be configured to provide a two-tier failover service based the server information table 120A and the database information table 120B. The mass storage device 912 may be connected to the processing unit 902 through a mass storage controller (not shown) connected to the bus 906. The mass storage device 912 and its associated computer-storage media may provide non-volatile storage for the computer 900. Although the description of computer-storage media contained herein refers to a mass storage device, such as a hard disk or CD-ROM drive, it should be appreciated by those skilled in the art that computer-storage media can be any available computer storage media that can be accessed by the computer 900.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900.

According to various embodiments, the computer 900 may operate in a networked environment using logical connections to remote computers through a network 918. The computer 900 may connect to the network 918 through a network interface unit 910 connected to the bus 906. It should be appreciated that the network interface unit 910 may also be utilized to connect to other types of networks and remote computer systems. The computer 900 may also include an input/output controller 908 for receiving and processing input from a number of input devices (not shown), including a keyboard, a mouse, a microphone, and a game controller. Similarly, the input/output controller 908 may provide output to a display or other type of output device (not shown).

The bus 906 may enable the processing unit 902 to read code and/or data to/from the mass storage device 912 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 914 may include software instructions that, when loaded into the processing unit 902 and executed, cause the computer 900 to generate field sets. The program modules 914 may also provide various tools or techniques by which the computer 900 may participate within the overall systems or operating environments using the components, flows, and data structures discussed throughout this description. For example, the program modules 914 may implement interfaces for generating field sets.

In general, the program modules 914 may, when loaded into the processing unit 902 and executed, transform the processing unit 902 and the overall computer 900 from a general-purpose computing system into a special-purpose computing system customized to generate field sets. The processing unit 902 may be constructed from any number of transistors or other discrete circuit elements, which may individually or collectively assume any number of states. More specifically, the processing unit 902 may operate as a finite-state machine, in response to executable instructions contained within the program modules 914. These computer-executable instructions may transform the processing unit 902 by specifying how the processing unit 902 transitions between states, thereby transforming the transistors or other discrete hardware elements constituting the processing unit 902.

Encoding the program modules 914 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 914 may transform the physical state of the semiconductor memory, when the software is encoded therein. For example, the program modules 914 may transform the state of transistors, capacitors, or other discrete circuit elements constituting the semiconductor memory.

As another example, the computer-storage media may be implemented using magnetic or optical technology. In such implementations, the program modules 914 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that concepts and technologies for providing a two-tier failover service are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing a two-tier failover service, the method comprising:

identifying a request to access content by an application associated with an application identifier;

retrieving, from a database information table, a first record corresponding to the application identifier, the first record comprising a reference identifier, a database name of a database, and a failover value;

retrieving, from a server information table, a second record corresponding to the reference identifier, the second record comprising an indication of a first server computer as a primary server computer and an indication of a second server computer as a secondary server computer; and generating a connection specification to either the first server computer or the second server computer based on the first record and the second record.

2. The method of claim 1, the method further comprising:

accessing either the first server computer or the second server computer utilizing the connection specification; and forwarding the request to the database at either the first server computer or the second server computer.

3. The method of claim 1, wherein the failover value specifies that no database-level failover has been initiated; and wherein generating the connection specification to either the first server computer or the second server computer based on the first record and the second record comprises generating the connection specification to the first server computer based on the first record and the second record.

4. The method of claim 1, wherein the failover value specifies that database-level failover has been initiated; and wherein generating the connection specification to either the first server computer or the second server computer based on the first record and the second record comprises generating the connection specification to the second server computer based on the first record and the second record.

5. The method of claim 1, wherein the connection specification comprises login and authentication information to either the first server computer or the second server computer.

6. The method of claim 1, wherein the first server computer and the second server computer are geo-redundant server computers.

7. The method of claim 1, wherein the first server computer comprises a first database associated with the database name; wherein the second server computer comprises a second database associated with the database name; and wherein the first database and the second database replicate each other.

8. The method of claim 1, wherein the failover value specifies that no database-level failover has been initiated; and the method further comprising:

determining whether a quantity of failing databases in the first server computer is greater than a threshold; and responsive to determining that the quantity of failing databases in the first server computer is greater than the threshold, updating the second record in the server information table, the updated second record comprising an indication of the second server computer as the primary server computer.

9. The method of claim 8, the method further comprising:

responsive to determining that the quantity of failing databases in the first server computer is not greater than the threshold, updating the failover value in the first record in the database information table to specify database-level failover.

10. A solid state storage device, an optical disk, or a magnetic storage device, having computer-executable instructions stored thereon which, when executed by a computer, cause the computer to:
- identify a request to access content by an application associated with an application identifier;
- retrieve, from a database information table, a first record corresponding to the application identifier, the first record comprising a reference identifier, a database name of a database, and a failover value;
- retrieve, from a server information table, a second record corresponding to the reference identifier, the second record comprising an indication of a first server computer as a primary server computer and an indication of a second server computer as a secondary server computer; and
- generate a connection specification to either the first server computer or the second server computer based on the first record and the second record.

11. The solid state storage device, optical disk, or magnetic storage device of claim 10, having further computer-executable instructions stored thereon which, when executed by the computer, cause the computer to:
- access either the first server computer or the second server computer utilizing the connection specification; and
- forward the request to the database at either the first server computer or the second server computer.

12. The solid state storage device, optical disk, or magnetic storage device of claim 10, wherein the failover value specifies that no database-level failover has been initiated; and
- wherein to generate the connection specification to either the first server computer or the second server computer based on the first record and the second record, the computer-executable instructions cause the computer to generate the connection specification to the first server computer based on the first record and the second record.

13. The solid state storage device optical disk or magnetic storage device of claim 10, wherein the failover value specifies that database-level failover has been initiated; and
- wherein to generate the connection specification to either the first server computer or the second server computer based on the first record and the second record, the computer-executable instructions cause the computer to generate the connection specification to the second server computer based on the first record and the second record.

14. The solid state storage device, optical disk, or magnetic storage device of claim 10, wherein the connection specification comprises login and authentication information to either the first server computer or the second server computer.

15. The solid state storage device, optical disk, or magnetic storage device of claim 10, wherein the first server computer and the second server computer are geo-redundant server computers.

16. The solid state storage device, optical disk, or magnetic storage device of claim 10, wherein the first server computer comprises a first database associated with the database name; wherein the second server computer comprises a second database associated with the database name; and wherein the first database and the second database replicate each other.

17. The solid state storage device, optical disk, or magnetic storage device of claim 10, wherein the failover value specifies that no database-level failover has been initiated; and
- the solid state storage device, optical disk, or magnetic storage device having further computer-executable instructions stored thereon which, when executed by the computer, cause the computer to:
  - determine whether a quantity of failing databases in the first server computer is greater than a threshold; and
  - responsive to determining that the quantity of failing databases in the first server computer is greater than the threshold, update the second record in the server information table, the updated second record comprising an indication of the second server computer as the primary server computer.

18. The solid state storage device, optical disk, or magnetic storage device of claim 17, having further computer-executable instructions stored thereon which, when executed by the computer, cause the computer to:
- responsive to determining that the quantity of failing databases in the first server computer is not greater than the threshold, update the failover value in the first record in the database information table to specify database-level failover.

19. A two-tier failover system, comprising:
- a data store comprising a server information table and a database information table, the database information table comprising a first record and a second record, the first record associated with a first application identifier and comprising a reference identifier, a first database name of a first database, and a first failover value specifying that no database-level failover has been initiated, the second record associated with a second application identifier and comprising the reference identifier, a second database name of a second database, and a second failover value specifying that database-level failover has been initiated, the server information table comprising a third record, the third record associated with the reference identifier and comprising an indication of a first server computer as a primary server computer and an indication of a second server computer as a secondary server computer;
- a processor;
- a memory communicatively coupled to the processor; and
- a program module which executes in the processor from the memory and which, when executed by the processor, causes the processor to
  - identify a request to access content by a first application associated with the first application identifier,
  - retrieve, from the database information table, the first record corresponding to the first application identifier, the first record comprising the reference identifier, the first database name of the first database, and the first failover value,
  - retrieve, from the server information table, the third record corresponding to the reference identifier, the third record comprising the indication of the first server computer as the primary server computer and the indication of the second server computer as the secondary server computer, and
  - generate a first connection specification to the first server computer based on the first record and the third record.

20. The two-tier failover system of claim 19, further comprising:
- wherein the program module which executes in the processor from the memory and which, when executed by the processor, causes the processor to
  - identify a second request to access content by a second application associated with the second application identifier,
  - retrieve, from the database information table, the second record corresponding to the second application identifier, the second record comprising the reference identifier, the second database name of the second database, and the second failover value, retrieve, from the server information table, the third record corresponding to the reference identifier, the third record comprising the indication of the first server computer as the primary server computer and the indication of the second server computer as the secondary server computer, and generate a second connection specification to the second server computer based on the second record and the third record.

* * * * *